(12) United States Patent
Takeda et al.

(10) Patent No.: US 12,024,243 B2
(45) Date of Patent: Jul. 2, 2024

(54) POWER STEERING VALVE

(71) Applicant: NISHINA INDUSTRIAL CO., LTD., Nagano (JP)

(72) Inventors: Yukinori Takeda, Nagano (JP); Shigeto Nakajima, Nagano (JP)

(73) Assignee: NISHINA INDUSTRIAL CO., LTD., Nagano (JP)

( * ) Notice: Subject to any disclaimer, the term of this patent is extended or adjusted under 35 U.S.C. 154(b) by 755 days.

(21) Appl. No.: 17/253,706

(22) PCT Filed: Sep. 30, 2019

(86) PCT No.: PCT/JP2019/038466
§ 371 (c)(1),
(2) Date: Dec. 18, 2020

(87) PCT Pub. No.: WO2020/075550
PCT Pub. Date: Apr. 16, 2020

(65) Prior Publication Data
US 2021/0347407 A1    Nov. 11, 2021

(30) Foreign Application Priority Data

Oct. 9, 2018    (JP) ................................ 2018-190670

(51) Int. Cl.
*B62D 5/097*    (2006.01)
*B62D 5/06*    (2006.01)
*B62D 5/083*    (2006.01)

(52) U.S. Cl.
CPC ............. *B62D 5/097* (2013.01); *B62D 5/062* (2013.01); *B62D 5/083* (2013.01)

(58) Field of Classification Search
CPC ................................ B62D 5/097; B62D 5/083
See application file for complete search history.

(56) References Cited

U.S. PATENT DOCUMENTS 3,880,554 A    4/1975  Termansen et al.
3,989,120 A *  11/1976 Lang ....................... B62D 5/097
                                             180/434

(Continued)

FOREIGN PATENT DOCUMENTS

GB    1446879       8/1976
JP    2002-19627    1/2002

OTHER PUBLICATIONS

International Search Report for PCT/JP2019/038466 dated Nov. 25, 2019.

*Primary Examiner* — Reinaldo Sanchez-Medina
*Assistant Examiner* — Nicole Gardner
(74) *Attorney, Agent, or Firm* — Stephen J. Weyer, Esq.; Stites & Harbison, PLLC

(57) ABSTRACT

This power steering valve (1) includes a sleeve (40), a spool (60) held in such a way as to be able to rotate within the housing (40), to which an input shaft U of a steering wheel S is coupled, a gerotor (30) fixed to the sleeve (10) and configured to be driven by hydraulic fluid which flows out from the predetermined opening of the sleeve (40), and a drive shaft (80) meshing with an inner rotor (32) of the gerotor (30) and pivotally supported in a swingable manner by the sleeve (40) with use of a pin (81), wherein an overall length Ld of the drive shaft (80) is formed to have a dimension defined by (¼)·Ls≤Ld≤(½)·Ls relative to an overall length Ls of the sleeve (40), and the pin (81) is arranged at a position nearer the gerotor (30) in an axial direction than a middle position in the sleeve (40).

20 Claims, 7 Drawing Sheets

(56) References Cited

U.S. PATENT DOCUMENTS

| | | | |
|---|---|---|---|
| 3,996,838 A | | 12/1976 | Goff |
| 4,311,171 A | | 1/1982 | Roberts |
| 4,533,303 A | * | 8/1985 | Petersen ................. B62D 5/097 |
| | | | 137/625.21 |
| 4,671,747 A | * | 6/1987 | Arbjerg .................. B62D 5/097 |
| | | | 91/375 R |
| 5,992,458 A | * | 11/1999 | Novacek ................. B62D 5/097 |
| | | | 137/625.24 |
| 9,238,479 B2 | | 1/2016 | Smith et al. |

* cited by examiner

POWER STEERING VALVE

TECHNICAL FIELD

The present invention relates to a power steering valve.

BACKGROUND ART

For example, as illustrated in FIG. 9, in vehicles such as forklifts (hereinafter referred to simply as "vehicles" in some cases), there is known a power steering valve which supplies hydraulic fluid to a steering cylinder which changes the direction of a tire while assisting a rotational force according to a rotational operation on a steering wheel performed by the driver (see PTL 1: U.S. Pat. No. 9,238,479).

CITATION LIST

Patent Literature

PTL 1: U.S. Pat. No. 9,238,479

SUMMARY OF INVENTION

Technical Problem

Here, with regard to a forklift taken as an example of the above-mentioned vehicle, since the vehicle dimension varies with a rated load, the size of a tire which is attached to the forklift also varies in diameter and width. Accordingly, even with regard to a steering cylinder which changes the direction of a tire, an actuating force appropriate for the size of the tire becomes required, so that a steering cylinder having the most appropriate cylinder diameter and stroke satisfying the actuating force is mounted. Therefore, with respect to a power steering valve which supplies hydraulic fluid used for actuating the steering cylinder, the performance capable of ejecting an oil quantity of hydraulic fluid appropriate for the cylinder diameter and stroke is also required.

Ordinarily, it would be ideal to, with respect to each type of steering cylinder, design a dedicated power steering valve most appropriate for the cylinder diameter and stroke thereof. However, in an actual manufacturing process, since manufacturing of a wide variety of products in small quantities becomes high in cost and is difficult to employ, to satisfy the required performance of a power steering valve, a method of treating a main body portion, which includes, for example, a housing, as a common part and changing the thickness of a gerotor, which is coupled to the main body portion and ejects hydraulic fluid, has been used to manufacture power steering valves having a performance (particularly, the ejection amount of hydraulic fluid) meeting an envisaged steering cylinder. Accordingly, the physical size of the main body portion has been made uniform in a large-sized form in such a way as to be also directly applicable to a large-capacity steering cylinder. Thus, since, in the case of applying the main body portion to a small-capacity steering cylinder, the physical size of the main body portion becomes overdesigned, there have occurred problems such as an increase in cost, such as material cost, and an increase in equipment weight, which are caused by the main body portion being large in size, as compared with the originally required physical size.

Solution to Problem

The present invention has been made in view of the above-mentioned circumstances, and has an object to provide a power steering valve which is able to be reduced in size as compared with a conventional power steering valve which is difficult to simply reduce in size.

As one embodiment, solution means such as those disclosed below are used to solve the above-mentioned problems.

A power steering valve to be disclosed includes a housing including a supply flow path into which hydraulic fluid flows from a hydraulic pressure source, a tank flow path from which the hydraulic fluid flows out to a reservoir tank, and a plurality of control flow paths from which the hydraulic fluid flows out to a steering cylinder and into which the hydraulic fluid flows from the steering cylinder, a sleeve cylindrically shaped, having a circumferential wall in which a plurality of openings into which the hydraulic fluid flows and from which the hydraulic fluid flows out is formed in a penetrating manner, and held in such a way as to be able to rotate in a circumferential direction within the housing, a spool cylindrically shaped, having a circumferential surface in which a plurality of axial grooves into and through which the hydraulic fluid which flows in from a predetermined one of the openings of the sleeve flows is drilled, held in such a way as to be able to rotate within a predetermined range in a circumferential direction within the sleeve, and having a second end portion to which an input shaft of a steering wheel is coupled, a gerotor fixed to a first end portion of the housing and configured to be driven by the hydraulic fluid which flows out from a predetermined one of the openings of the sleeve, and a drive shaft having a first end portion which meshes with an inner rotor of the gerotor and a second end portion which is pivotally supported in a swingable manner by the sleeve with use of a pin, wherein the hydraulic fluid which flows in from the gerotor is configured to flow through according to an amount of overlap between a predetermined one of the axial grooves of the spool and a predetermined one of the openings of the sleeve, which is set in association with rotation of the steering wheel, and flow out to the steering cylinder via the control flow paths, wherein the drive shaft is formed with a dimension defined in such a manner that an overall length thereof Ld is in a range of:

$$(1/4)\cdot Ls \leq Ld \leq (1/2)\cdot Ls$$

relative to an overall length Ls of the sleeve, and wherein the pin is arranged at a position nearer the gerotor in an axial direction than a middle position in the sleeve.

Advantageous Effects of Invention

According to the present invention, it becomes possible to implement a reduction in size, particularly, a reduction in diameter, of a power steering valve relative to a conventional power steering valve which is difficult to simply reduce in size.

DESCRIPTION OF EMBODIMENTS

Figure 1:
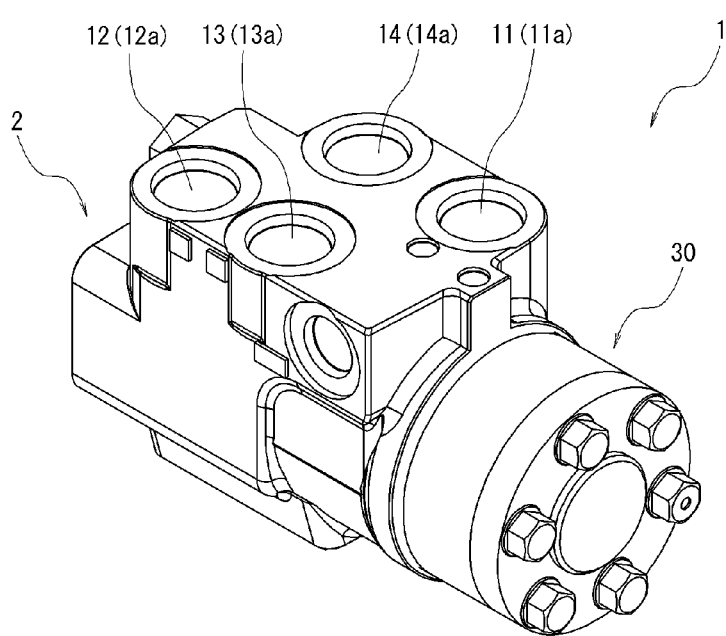
FIG. 1 is a schematic view (perspective view) illustrating an example of a power steering valve according to an embodiment of the present invention.
Figure 2:
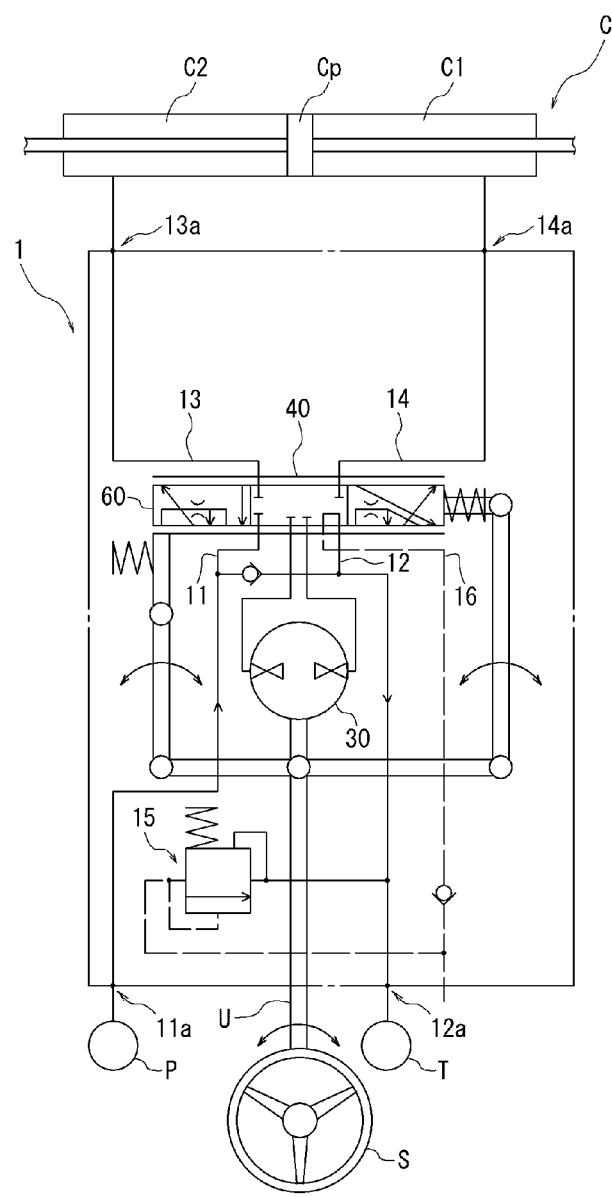
FIG. 2 is a schematic view illustrating a system configuration example using the power steering valve illustrated in FIG. 1.
Figure 3:
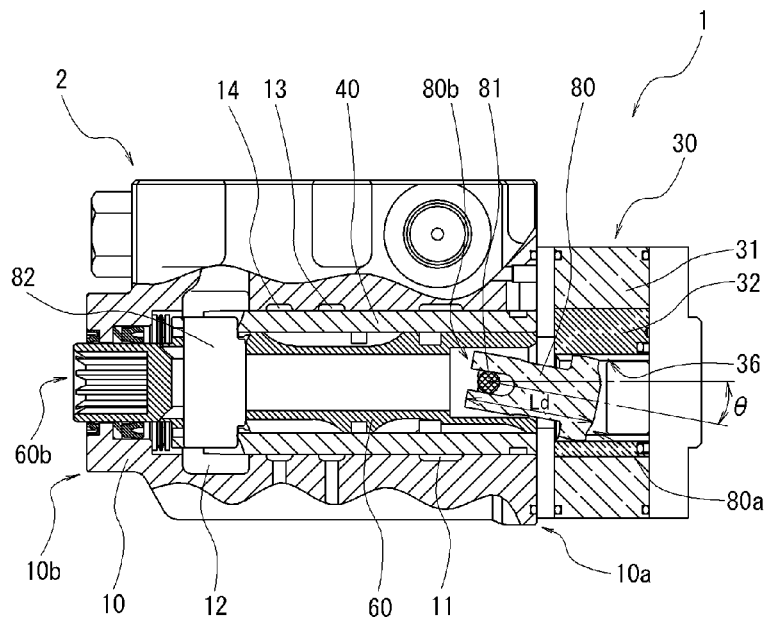
FIG. 3 is a schematic view (side sectional view) illustrating an example of the power steering valve illustrated in FIG. 1.

An embodiment of the present invention will be described in detail below with reference to the drawings. FIG. 1 is a perspective view (schematic view) illustrating an example of a power steering valve 1 according to the present embodiment. Moreover, FIG. 2 is a schematic view illustrating configurations of the power steering valve 1 and a system using the power steering valve 1. Moreover, FIG. 3 is a side sectional view (schematic view) of the power steering valve 1. Furthermore, in all of the figures used to explain the embodiment, members having the same functions are assigned the respective same reference characters, and the repetitive description thereof may be omitted in some cases.

The power steering valve 1 according to the present embodiment is a device which, in a vehicle such as a forklift, supplies hydraulic fluid to a steering cylinder which changes the direction of a tire while assisting a rotational force according to a rotational operation on a steering wheel performed by the driver.

Figure 9:
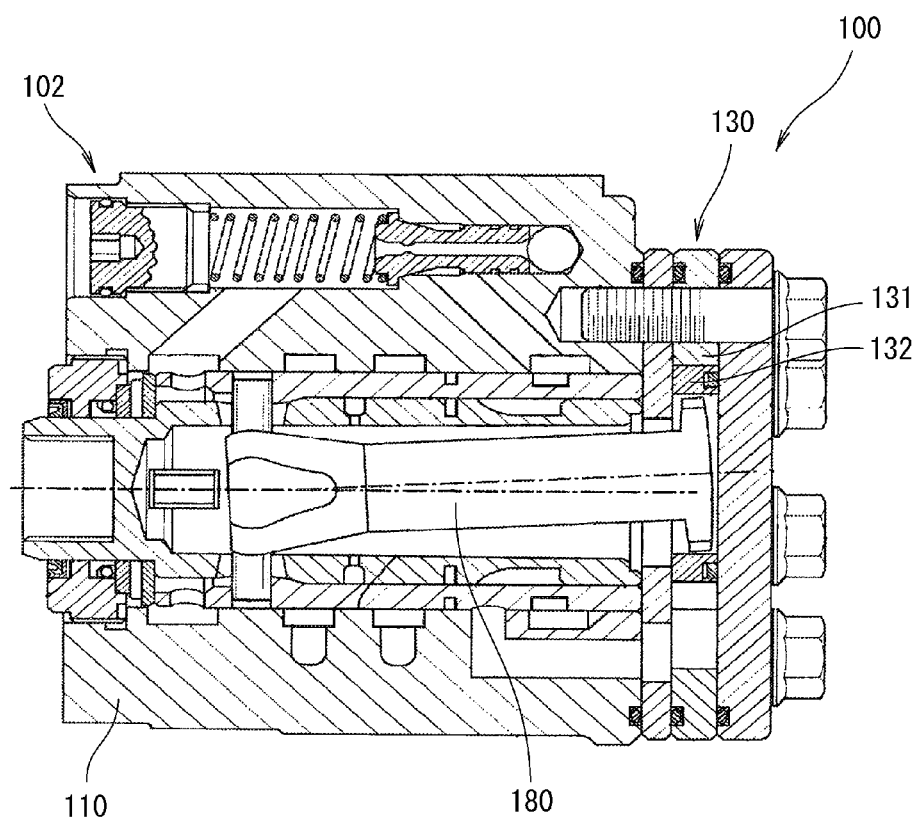
FIG. 9 is a schematic view (side sectional view) illustrating an example of a power steering valve according to a conventional embodiment.

To begin with, a conventional power steering valve 100 has a configuration illustrated as an example in FIG. 9, and is generally provided as a product configured to have a performance (particularly, the ejection amount of hydraulic fluid) meeting an envisaged steering cylinder by a method of treating a main body portion 102, which includes, for example, a housing 110, as a common part and changing the thickness of a gerotor 130, which is coupled to the main body portion 102 and ejects hydraulic fluid, from a viewpoint of requirements for, for example, efficiency and cost reduction in a manufacturing process. Therefore, as mentioned in the above problems, in the case of applying the power steering valve 100 to a small-capacity steering cylinder, the physical size of the main body portion 102 becomes overdesigned, so that an increase in cost, such as material cost, and an increase in equipment weight have been incurred.

Therefore, the inventors of the present application aggressively conducted research about a power steering valve which became appropriate for the case of being applied to a small-capacity steering cylinder. With regard to a power steering valve adapted for a relatively small-capacity steering cylinder, the ejection amount of hydraulic fluid in a gerotor only needs to be a relatively small capacity. Thus, it is conceivable that, if the gerotor is reduced in diameter, along with this reduction, a main body portion including, for example, a housing is able to be reduced in diameter. Accordingly, from a viewpoint of an ordinary design concept, it can be thought that, if the conventional power steering valve 100 is reduced in size totally at the same ratio (reduced both in a radial direction and an axial direction), a configuration to be attained is able to be accomplished.

However, when the above-mentioned configuration example was examined, it turned out that there occurred a problem in which, although being possible in theory (in design), the above-mentioned configuration example had a difficulty in terms of the processing accuracy of a machine tool for use in manufacturing. Specifically, while the gerotor 130 which is used for the conventional power steering valve 100 generally has a configuration in which, from a viewpoint of ensuring an optimal ejection amount, the number of recessed portions provided on the inner circumference of an outer rotor 131 is 7 and the number of raised portions provided on the outer circumference of an inner rotor 132 is 6, if the gerotor 130 is simply reduced in diameter, a smaller-diameter endmill has to be used as an endmill in a machine tool which processes the outer rotor 131 and the inner rotor 132 (particularly, the recessed portions of the outer rotor 131) and, because of the strength of the endmill being low, a processing accuracy to be attained is not able to be acquired, as in the above-mentioned problem.

As mentioned above, the inventors of the present application determined that a configuration obtained by simply reducing the conventional power steering valve 100 in size was difficult to accomplish. Furthermore, following the result of study, the inventors of the present application enabled accomplishing a power steering valve which is able to be relatively reduced in size, particularly, reduced in diameter, by studying out a new configuration such as that described below, which is different from the conventional configuration.

The power steering valve 1 according to the present invention is configured, as one embodiment, to include a main body portion 2, in which a housing 10 having a plurality of flow paths for inflow and outflow of hydraulic fluid is arranged, a cylindrically shaped sleeve 40 held in such a way as to be able to rotate in a circumferential direction within the housing 10, a cylindrically shaped spool 60 held in such a way as to be able to rotate within a predetermined range in a circumferential direction within the sleeve 40 and having a second end portion 60b to which an input shaft U of a steering wheel S is coupled, a gerotor 30 fixed to a first end portion 10a of the housing 10 and configured to be driven by the hydraulic fluid which flows out from a predetermined opening of the sleeve 40, and a drive shaft 80 having a first end portion 80a which meshes with an internal gear 36 of an inner rotor 32 of the gerotor 30 and a second end portion 80b which is pivotally supported in a swingable manner by the sleeve 40 with use of a pin 81. Furthermore, the spool 60 is held by the sleeve 40 in the state of being urged in such a way as to be situated at a predetermined neutral position relative to the sleeve 40 by a flat spring 82 provided in an intervenient manner between the spool 60 and the sleeve 40.

With the above-mentioned configuration, hydraulic fluid is supplied from a predetermined flow path of the housing 10 to the sleeve 40 while the flow thereof is controlled according to the amount of overlap between a predetermined axial groove of the spool 60 and a predetermined opening of the sleeve 40 which is set in association with rotation of the steering wheel S. The hydraulic fluid flows out from the predetermined opening of the sleeve 40 and then flows into the gerotor 30, and thus rotates the inner rotor 32. This enables obtaining the action of the sleeve 40 coupled to the inner rotor 32 via the drive shaft 80 and the pin 81 being rotated and the action of causing a piston Cp to operate for performing steering by hydraulic fluid which flows out from the gerotor 30 and then flows into the sleeve 40 flowing out from the predetermined opening of the sleeve 40 and then flowing into a steering cylinder C. Thus, such a fundamental action required for power steering valves as to supply hydraulic fluid to the steering cylinder C, which changes the direction of a tire, while assisting a rotational force according to a rotational operation on the steering wheel S performed by the driver is obtained.

Figure 6:
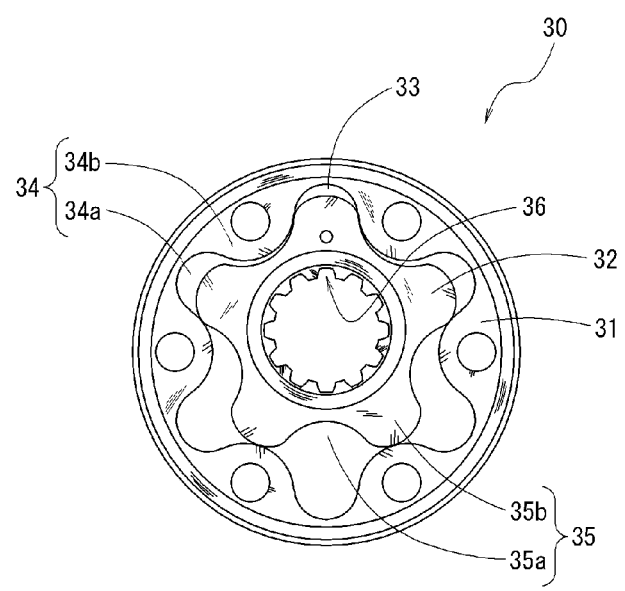
FIG. 6 is a schematic view (front sectional view) illustrating an example of a gerotor of the power steering valve illustrated in FIG. 1.

Here, the gerotor 30 according to the present embodiment is an internal contact-type pump in which, as illustrated in the sectional view of FIG. 6, the inner rotor 32 is housed in a housing space 33 provided at the center of an outer rotor 31 and rotates while performing sliding movement while an outer gear (a gear including predetermined recessed portions 35a and raised portions 35b arranged alternately one by one) 35 provided on the outer circumference of the inner rotor 32 meshes with an inner gear (a gear including predetermined recessed portions 34a and raised portions 34b arranged alternately one by one) 34 provided on the inner circumference of the housing space 33. Accordingly, "driving of the gerotor 30" refers to an operation in which the inner rotor 32 is rotated by hydraulic fluid relative to the outer rotor 31 fixed to the housing 10. As a characteristic configuration in the present embodiment, the number of recessed portions 34a of the inner gear 34 is set to 6 (thus, the number of raised portions 34b adjacent to the recessed portions 34a being the same number), and the number of raised portions 35b of the outer gear 35 is set to 5 (thus, the number of recessed portions 35a adjacent to the raised portions 35b being the same number).

According to this configuration, since an endmill relatively large in diameter and high in strength is able to be used as an endmill of a machine tool which processes the outer rotor 31 and the inner rotor 32 (particularly, the recessed portions 34a of the outer rotor 31), a desired high processing accuracy can be obtained. Accordingly, it is possible to attain a reduction in diameter of the gerotor 30. On the other hand, a reduction in diameter of the gerotor 30 becomes a cause of decreasing the ejection amount of hydraulic fluid. To address this problem, the inventors of the present application did not employ a configuration of increasing the ejection amount by increasing the thickness of the gerotor 30, because of incurring an increase in size of the device (an increase in length in the axial direction), but attempted a configuration of increasing the ejection amount of hydraulic fluid from the gerotor 30 by making a reduction in diameter of the gerotor 30 and setting the amount of eccentricity of the inner rotor 32 relative to outer rotor 31 larger. However, the inventors of the present application confronted a problem in which, if a configuration taken as an example in the conventional power steering valve 100 was followed, it became impossible to drive a gerotor 30 relatively large in the amount of eccentricity. This occurred due to a main cause in which, in the case of a configuration similar to that of a conventional drive shaft 180 (see FIG. 9), such a configuration was not able to follow (engage with) the gerotor 30 large in the amount of eccentricity (here, the inner rotor 32).

To address this issue, the inventors of the present application enable solving the issue by studying out the following configuration. More specifically, in the studied-out configuration, the drive shaft 80 is formed with a dimension defined in such a manner that an overall length thereof Ld is in a range of:

$$(1/4) \cdot Ls \leq Ld \leq (1/2) \cdot Ls \quad \text{formula (1)}$$

relative to an overall length Ls of the sleeve 40, and the pin 81, which is used to fix the drive shaft 80 to be pivotally supported by the sleeve 40, is arranged at a position nearer the gerotor 30 (nearer a first end portion 40a) in an axial direction than a middle position (which indicates a position at an equal distance from both ends) in the sleeve 40. According to this configuration, it becomes possible to drive, by the drive shaft 80, even the gerotor 30, which is relatively reduced in diameter and is set to have a relatively large amount of eccentricity. Incidentally, a maximum swing angle θ of the drive shaft 80 is attainable up to θ=about 10 (degrees) (greater than or equal to three times a conventional one).

To attain the above-described configuration, the housing 10, the sleeve 40, and the spool 60 according to the embodiment have the following characteristic configurations.

First, the housing 10 includes a supply flow path 11, into which hydraulic fluid flows from a hydraulic pressure source (for example, a hydraulic pump, a hydraulic cylinder, or the like) P, a tank flow path 12, from which hydraulic fluid flows out to a reservoir tank T, and a plurality of control flow paths (a first control flow path 13 and a second control flow path 14) from which hydraulic fluid flows out to the steering cylinder C and into which hydraulic fluid flows from the steering cylinder C (see FIGS. 2 and 3). Furthermore, in FIG. 1, an external connection opening (port) 11a of the supply flow path 11, an external connection opening (port) 12a of the tank flow path 12, an external connection opening (port) 13a of the first control flow path 13, and an external connection opening (port) 14a of the second control flow path 14 are illustrated. Additionally, the housing 10 includes a pressure adjusting unit 15, which adjusts an inflow pressure of hydraulic fluid which flows from the supply flow path 11 into the sleeve 40, and an LS flow path 16, which communicates with the pressure adjusting unit 15 (see FIG. 2).

Figure 4:
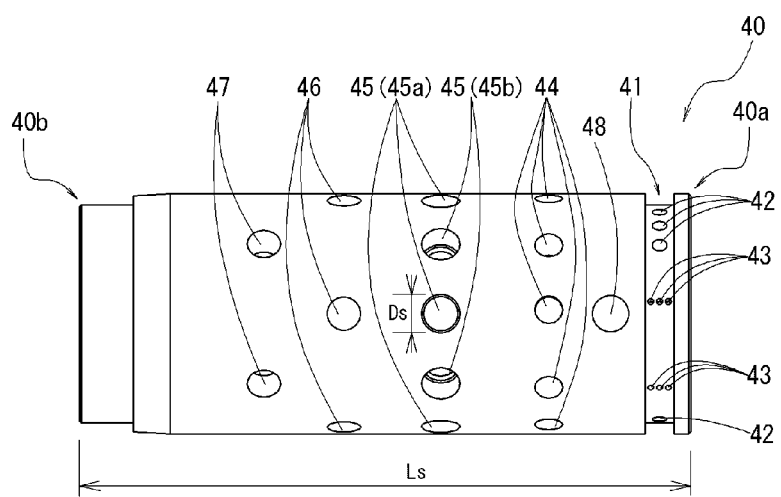
FIG. 4 is a schematic view (side view) illustrating an example of a sleeve of the power steering valve illustrated in FIG. 1.

Next, as illustrated in the side view of FIG. 4, the sleeve 40 is cylindrical as a whole (in the form of a composite cylinder having portions different in outer diameter depending on axial positions) and has a circumferential wall in which a plurality of openings into which hydraulic fluid flows from a predetermined flow path of the housing 10 and a plurality of openings from which the hydraulic fluid flows out to a predetermined flow path of the housing 10 are formed in a penetrating manner. Additionally, on an outer circumferential surface nearer the first end portion 40a, an LS portion 41, which causes a part of hydraulic fluid flowing in from the gerotor 30 to flow out to the LS flow path 16, is formed. As an example, the LS portion 41 is configured to include an annular groove (in the present embodiment, assumed to be an annular groove covering the entire circumference) formed on the outer circumferential surface of the sleeve 40. Alternatively, as a modification example, instead of a configuration in which an annular groove is provided on the outer circumferential surface of the sleeve 40 (or in parallel with a configuration in which such an annular groove is provided), a configuration in which an annular groove is provided on an inner circumferential surface of the housing 10 at the corresponding same position can also be employed (not illustrated). Furthermore, reference numeral 48 in the figure denotes a through-hole in which the pin 81, which fixes and pivotally supports the drive shaft 80 in such a way as to be able to swing relative to the sleeve 40, is fitted.

Here, the above-mentioned openings of the sleeve 40 are described in more detail. As such openings, each of an opening for LS 42, which is arranged at a bottom portion of the LS portion (in the present embodiment, being configured to be provided with an annular groove on the outer circumferential surface of the sleeve 40) 41, an opening for neutral 43, a supply opening 44, which communicates with the supply flow path 11 and into which hydraulic fluid flows, an input-output opening 45, from which hydraulic fluid flows to the gerotor 30 or into which hydraulic fluid flows from the gerotor 30, and a first control opening 46 and a second control opening 47, which communicate with the first control flow path 13 and the second control flow path 14, respectively, and from which and into which hydraulic fluid flows, is provided as one opening or a plurality of openings (in the present embodiment, a plurality of openings). Furthermore, a flow path through which the input-output opening 45 and the gerotor 30 communicate with each other is provided at a predetermined position of the housing 10 (not illustrated).

Figure 5:
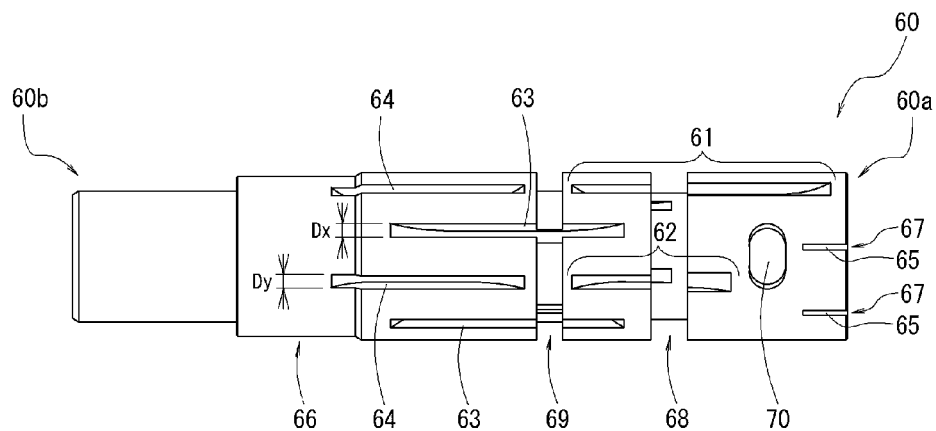
FIG. 5 is a schematic view (side view) illustrating an example of a spool of the power steering valve illustrated in FIG. 1.

Next, as illustrated in the side view of FIG. 5, the spool 60 has a cylindrical shape in its entirety (a composite cylindrical shape having portions differing in outer diameter depending on axial locations), and, on the circumferential surface, a plurality of axial grooves (each groove having a longitudinal direction which is parallel to the axial direction and having a predetermined width in the circumferential direction), through which hydraulic fluid which flows in from a predetermined opening of the sleeve 40 flows and from which hydraulic fluid flows out to a predetermined region (for example, a predetermined opening of the sleeve 40) is drilled. Furthermore, reference character 70 in the figure denotes a thorough-hole in the form of a long hole, through which the pin 81 used for fixing the drive shaft 80 to the sleeve 40 penetrates and which allows the pin 81 to relatively move along the circumferential direction. This configuration of the thorough-hole 70 enables the spool 60, which is coupled to the input shaft U of the steering wheel S, to rotate within a range to cause a predetermined angular difference in the circumferential direction to occur relative to the sleeve 40. Moreover, as mentioned above, the sleeve 40 and the spool 60 are coupled to each other via the flat spring 82, and, when an angular difference has occurred therebetween due to the relative rotation thereof, are urged in directions to return to a neutral state having no angular difference by the flat spring 82.

Here, the above-mentioned axial grooves of the spool 60 are described in more detail. As such axial grooves, each of a first groove 61, which is formed to have a length leading from the opening for LS 42 to the input-output opening 45 via the supply opening 44, a second groove 62, which is formed to have a length leading from the supply opening 44 to the input-output opening 45, a third groove 63, which is formed to have a length leading from the input-output opening 45 to the second control opening 47 via the first control opening 46, a fourth groove 64, which is formed to have a length leading from the first control opening 46 to a circumferential surface flow path 66, which is annularly formed on the outer circumferential surface of the spool 60 and communicates with the tank flow path 12, via the second control opening 47, and a fifth groove 65, which is formed to have a length leading from the opening for neutral 43 to a penetration flow path 67, which is provided at a first end portion 60a of the spool 60 and penetrates through the circumferential wall in such a way as to communicate with an inner cylinder portion of the spool 60, is provided as one groove or a plurality of grooves (in the present embodiment, a plurality of grooves).

With regard to the above-mentioned axial grooves, which are described here in more detail, the first groove 61 is formed to have an axial dimension and a width dimension which enable overlapping with the opening for LS 42, the supply opening 44, and the input-output opening 45 when the spool 60 is at a predetermined rotation position (a position causing a predetermined angular difference to occur relative to the sleeve 40, and the same applying hereinafter). Moreover, the second groove 62 is formed to have an axial dimension and a width dimension which enable overlapping with the supply opening 44 and the input-output opening 45 when the spool 60 is at a predetermined rotation position. Moreover, the third groove 63 is formed to have an axial dimension and a width dimension which enable overlapping with the input-output opening 45, the first control opening 46, and the second control opening 47 when the spool 60 is at a predetermined rotation position. Moreover, the fourth groove 64 is formed to have an axial dimension and a width dimension which enable overlapping with the first control opening 46, the second control opening 47, and the circumferential surface flow path 66 when the spool 60 is at a predetermined rotation position. Moreover, the fifth groove 65 is formed to have an axial dimension and a width dimension which enable overlapping with the opening for neutral 43 and the penetration flow path 67 when the spool 60 is at a neutral position (a position causing a neutral to occur relative to the sleeve 40).

Additionally, on the circumferential surface of the spool 60, a first annular groove 68, which is annularly formed in such a way as to communicate with all of the plurality of first grooves 61 and all of the plurality of second grooves 62, is arranged. Moreover, a second annular groove 69, which is annularly formed in such a way as to communicate with all of the plurality of third grooves 63, is arranged.

According to the above-described configuration, a fundamental action required for the power steering valve 1, i.e., the action of, according to a steering operation of the driver, while assisting the rotation of the steering wheel S (input shaft U) by driving the gerotor 30 with hydraulic fluid supplied from a hydraulic pressure source, performing steering of the tires by causing hydraulic fluid flowing back from the gerotor 30 to flow out to the steering cylinder C, is able to be attained. Additionally, a configuration which enables driving of the gerotor 30, which is relatively reduced in diameter and the amount of eccentricity of which is set relatively large, i.e., a configuration in which the drive shaft 80 has a dimension satisfying the above-mentioned formula (1) and the pin 81, which pivotally supports and fixes the drive shaft 80 to the sleeve 40, is arranged at a position nearer the gerotor 30 (nearer the first end portion 40a) than a middle position (referring to a position equally distant from the both end portions) in the axial direction of the sleeve 40 is able to be implemented.

In the present embodiment, as a result of a study about a structure in which a predetermined opening of the sleeve 40 required to attain the above-mentioned fundamental action of the power steering valve is able to be obtained and the sleeve 40 is not made elongated, the following configuration was studied out. Specifically, it is favorable to employ a configuration in which the through-hole 48 is formed at a position nearer the gerotor 30 (nearer the first end portion 40a) in the axial direction than a position at which the supply opening 44 communicating with the supply flow path 11 is arranged (referring to a position of a predetermined distance from the first end portion 40a) in the axial direction of the sleeve 40 and the pin 81 is fitted into the through-hole 48. Additionally, it is more favorable to employ a configuration in which the through-hole 48 is formed at a position between a position at which the supply opening 44 communicating with the supply flow path 11 is arranged (referring to a position of a predetermined distance from the first end portion 40a (a distance relatively greater than that from the LS portion 41)) and a position at which the LS portion 41 is arranged (referring to a position of a predetermined distance from the first end portion 40a (a distance relatively less than that from the supply opening 44)) in the axial direction of the sleeve 40 and the pin 81 is fitted into the through-hole 48.

According to the above-mentioned configurations, a reduction in diameter of the gerotor 30 is enabled, so that a reduction in diameter of the main body portion 2, which is coupled to the gerotor 30, is also enabled. However, with regard to the sleeve 40 and the spool 60 a reduction in diameter of each of which is attempted in association with a reduction in diameter of the main body portion 2, two new problems may occur.

First, one is a problem of, in the sleeve 40 reduced in diameter, how to appropriately form the opening for LS and the opening for neutral. To address this problem, in the sleeve 40 according to the present embodiment, a configuration in which, as the opening for LS 42, a plurality of through-holes arranged side by side in the circumferential direction and having a relatively large diameter is formed and, as the opening for neutral 43, a plurality of through-holes arranged side by side in the axial direction and having a relatively small diameter is formed is employed.

The other one is a problem of, in the sleeve 40 and the spool 60 reduced together in diameter, how to reduce a pressure loss occurring when hydraulic fluid flows through by a pressure of the hydraulic pressure source. According to an ordinary design concept, a solution method of enlarging, for example, openings of the sleeve 40 and width dimensions of axial grooves of the spool 60 is conceivable. However, the sleeve 40 reduced in diameter has a limitation in enlarging the inner diameter of each opening, and the spool 60 reduced in diameter has a limitation in enlarging the width dimension and depth dimension of each axial groove.

Therefore, to address the above-mentioned problems, with regard to the sleeve 40 and the spool 60 according to the present embodiment, studying out the following configuration enables implementing the solution thereof. More specifically, a configuration in which the sleeve 40 and the spool 60 are formed in such a dimensional manner that a circumferential width Dx of the third groove 63 and a circumferential width Dy of the fourth groove 64, which are provided on the spool 60, satisfy:

$$Dx=Dy \qquad \text{formula (2), and}$$

with respect to a diameter Ds (for example, about 4 mm) of the input-output opening 45, which is provided on the sleeve 40, satisfy:

$$(\tfrac{1}{2})\cdot Ds < Dx < Ds \qquad \text{formula (3)}$$

$$(\tfrac{1}{2})\cdot Ds < Dy < Ds \qquad \text{formula (4)}.$$

According to this configuration, with regard to the sleeve 40 and the spool 60 reduced together in diameter, it becomes possible to reduce a pressure loss of hydraulic fluid. Particularly, it is favorable that the configuration is set to about $Dx=Dy=(\tfrac{3}{4})\cdot Ds$. Furthermore, in the present embodiment, the diameter of each of the first control opening 46 and the second control opening 47 is set to have the same dimension as the diameter Ds of the input-output opening 45.

Figure 7:
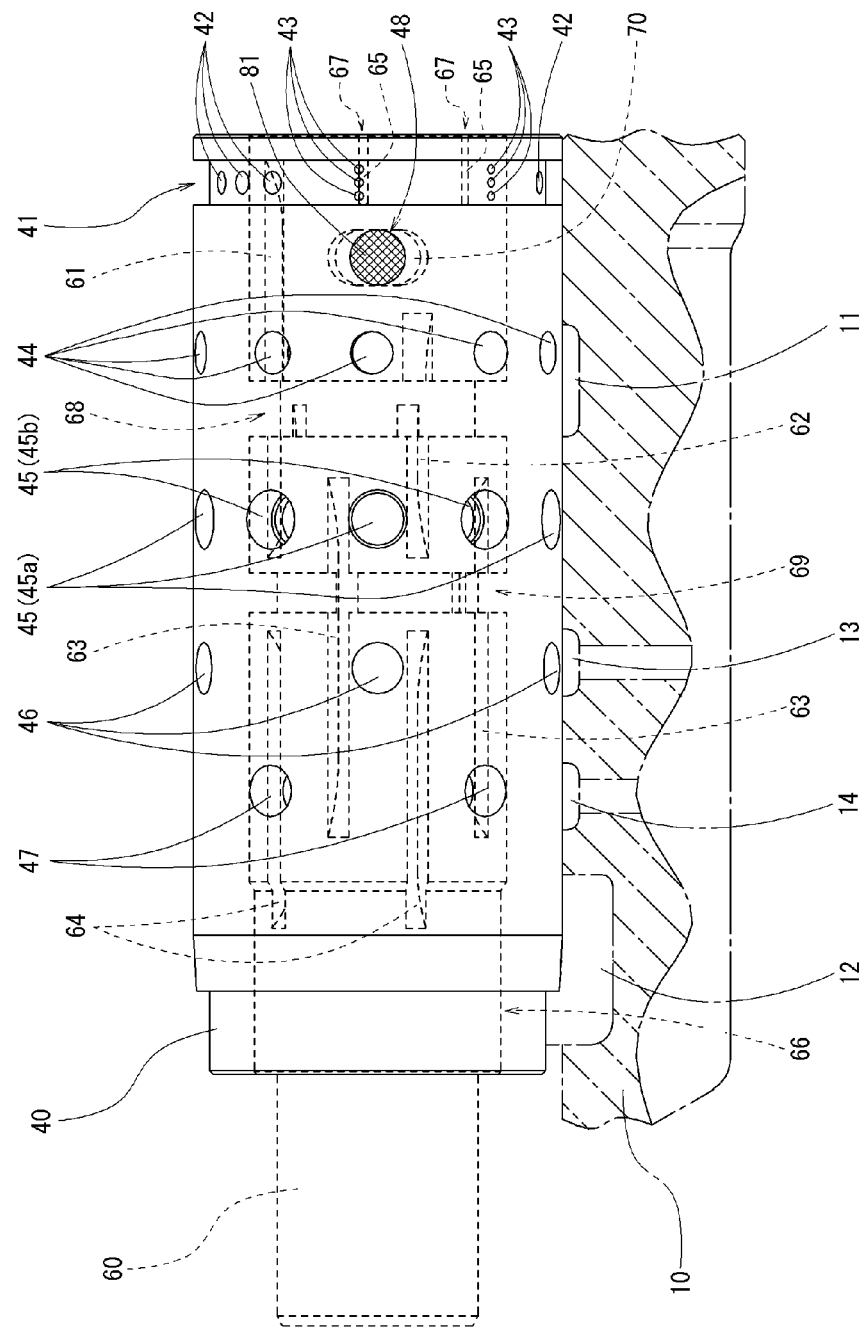
FIG. 7 is an explanatory diagram used to explain a configuration and operation of the power steering valve illustrated in FIG. 1.

In the following description, the action of the power steering valve 1 according to the present embodiment is described with reference to, for example, the system configuration diagram of FIG. 2 and the explanatory diagram of FIG. 7. Here, FIG. 7 is a diagram illustrating, in an easy-to-understand way, a positional relationship between the flow paths of the housing 10 (illustrated with dashed-dotted line), the openings of the sleeve 40 (illustrated with solid lines), and the axial grooves of the spool 60 (illustrated with dashed lines) in a state in which the housing 10, the sleeve 40, and the spool 60 are assembled together. Furthermore, due to the sleeve 40 formed in a cylindrical shape having a predetermined thickness at the circumferential wall thereof, FIG. 7 may cause an optical illusion. Specifically, while, in positions near the middle (for example, the positions of the through-hole 70 and the pin 81), there is no optical deviation between the opening of the sleeve 40 and the axial groove of the spool 60, in positions separate from the middle (for example, the positions of the second control opening 47 and the fourth groove 64), an optical illusion occurs between the opening of the sleeve 40 and the axial groove of the spool 60. With a specific example taken, while the second control opening 47 and the fourth groove 64 appear to communicate with each other, this is because the outline on the outer wall side in the second control opening 47 overlaps the fourth groove 64, so that, actually in this state, as apparent from the outline on the inner wall side in the second control opening 47, the second control opening 47 and the fourth groove 64 do not communicate with each other.

The state illustrated in FIG. 7 corresponds to a case where the steering wheel S is currently at a neutral position. In this state, the spool 60 is currently at a neutral position in which there is no angular difference with respect to the sleeve 40. Moreover, the opening for neutral 43 provided in the LS portion 41 of the sleeve 40 and the fifth groove 65 provided on the spool 60 communicate with each other. Furthermore, the LS portion 41 and the supply opening 44 of the sleeve 40 do not communicate with each other. Accordingly, since there occurs a state in which the LS portion 41, which communicates with the LS flow path 16, and the fifth groove 65, which communicates with the tank flow path 12, communicate with each other, the action of making the pressure of hydraulic fluid in the LS portion 41 equal to a pressure in the tank flow path 12 is obtained. This is performed to detect a steering operation at a neutral position, because the LS flow path 16 communicates with the pressure adjusting unit 15 and is a mechanism which detects a steering operation and feeds back a pressure to the LS portion 41. Incidentally, the fifth groove 65 is configured to communicate with the tank flow path 12 via the penetration flow path 67, the inner cylinder portion of the spool 60, an opening portion near the second end portion 60b of the spool 60 (provided at a portion where the flat spring 82 is arranged), and an opening portion near the second end portion 40b of the sleeve 40 (provided at a portion where the flat spring 82 is arranged). Furthermore, in the present embodiment, the fifth groove 65 being formed in a through-hole shape is configured to be also used as the penetration flow path 67.

Next, when, in the state illustrated in FIG. 7, the driver rotationally operates the steering wheel S leftward (counterclockwise), the spool 60, to which the input shaft U of the steering wheel S is coupled, rotates in the same direction, so that a state in which the spool 60 has an angular difference relative to the sleeve 40 against the urging force of the flat spring 82 is obtained. With this state, an overlap between the supply opening 44 of the sleeve 40 and the second groove 62 of the spool 60 occurs. Moreover, an overlap between the second groove 62 and the input-output opening 45 (in this case, 45*a*) occurs. Moreover, an overlap between the input-output opening 45 (in this case, 45*b*) and the third groove 63 occurs. Moreover, an overlap between the third groove 63 and the second control opening 47 occurs. Moreover, an overlap between the first control opening 46 and the fourth groove 64 occurs. Accordingly, hydraulic fluid having flowed in from the supply opening 44 flows out from the input-output opening 45 (in this case, 45*a*) to the gerotor 30 via the second groove 62 (and the annular groove 68) to drive the gerotor 30, and then flows into the input-output opening 45 (in this case, 45*b*). Furthermore, in the present embodiment, the input-output opening 45*a* and the input-output opening 45*b* are alternately provided one by one in the circumferential direction.

On the other hand, hydraulic fluid having flowed into the input-output opening 45 (in this case, 45*b*) after driving the gerotor 30 flows out from the second control opening 47 to the second control flow path 14 via the third groove 63 (and the annular groove 69). Accordingly, hydraulic fluid having flowed out from the second control flow path 14 flows into a first chamber C1 of the steering cylinder C to cause the piston Cp to move leftward. Here, hydraulic fluid for a second chamber C2 having been pushed for movement by the movement of the piston Cp flows from the first control flow path 13 into the first control opening 46 and then flows into and through the tank flow path 12 via the fourth groove 64.

Moreover, the supply opening 44 of the sleeve 40 and the opening for LS 42 are configured to communicate with each other via the second groove 62, the annular groove 68, and the first groove 61 of the spool 60. With this configuration, hydraulic fluid flows into and through the pressure adjusting unit 15 via the LS flow path 16, which is provided in such a way as to communicate with the LS portion 41.

With the above-described action, when the gerotor 30 is driven, i.e., the inner rotor 32 is rotated relative to the outer rotor 31, which is fixed, the drive shaft 80, which is meshed with the internal gear 36 of the inner rotor 32, is rotated in the same direction. This causes the sleeve 40, which is coupled to the drive shaft 80 by the pin 81, to be rotated in the same direction. In this way, causing an angular difference to occur between the spool 60 and the sleeve 40 by rotating the steering wheel S enables obtaining the action of rotating the sleeve 40, which is coupled to the inner rotor 32, by the gerotor 30 (specifically, the inner rotor 32) being driven (rotated) with hydraulic fluid (causing the sleeve 40 to follow the spool 60 while keeping the above-mentioned angular difference) and the action of performing steering by causing hydraulic fluid to flow in and through the steering cylinder C to cause the piston Cp to operate.

Furthermore, when the rotation of the steering wheel S continues, since the angular difference remains occurring, the above-mentioned action continues accordingly. At this time, in a case where the rotational speed is high, the angular difference becomes large, so that the above-mentioned action occurs at high speed, and, in a case where the rotational speed is low, the angular difference becomes small, so that the above-mentioned action occurs at low speed.

On the other hand, when the rotation of the steering wheel S is stopped, since a state in which the angular difference has been dissolved by the urging force of flat spring 82 (a state in which the spool 60 is at a neutral position in which there is no angular difference relative to the sleeve 40) is obtained, the above-mentioned action stops.

Next, when, in the state illustrated in FIG. 7, the driver rotationally operates the steering wheel S rightward (clockwise), the spool 60, to which the input shaft U of the steering wheel S is coupled, rotates in the same direction, so that a state in which the spool 60 has an angular difference relative to the sleeve 40 against the urging force of the flat spring 82 is obtained. With this state, an overlap between the supply opening 44 of the sleeve 40 and the first groove 61 of the spool 60 occurs. Moreover, an overlap between the first groove 61 and the input-output opening 45 (in this case, 45*b*) occurs. Moreover, an overlap between the input-output opening 45 (in this case, 45*a*) and the third groove 63 occurs. Moreover, an overlap between the third groove 63 and the first control opening 46 occurs. Moreover, an overlap between the second control opening 47 and the fourth groove 64 occurs. Accordingly, hydraulic fluid having flowed in from the supply opening 44 flows out from the input-output opening 45 (in this case, 45*b*) to the gerotor 30 via the first groove 61 (and the annular groove 68) to drive the gerotor 30, and then flows into the input-output opening 45 (in this case, 45*a*).

On the other hand, hydraulic fluid having flowed into the input-output opening 45 (in this case, 45*a*) after driving the gerotor 30 flows out from the first control opening 46 to the first control flow path 13 via the third groove 63 (and the annular groove 69). Accordingly, hydraulic fluid having flowed out from the first control flow path 13 flows into the second chamber C2 of the steering cylinder C to cause the piston Cp to move rightward. Here, hydraulic fluid for the first chamber C1 having been pushed for movement by the movement of the piston Cp flows from the second control flow path 14 into the second control opening 47 and then flows into and through the tank flow path 12 via the fourth groove 64.

Moreover, the supply opening 44 of the sleeve 40 and the opening for LS 42 are configured to communicate with each other via the first groove 61 of the spool 60. With this configuration, hydraulic fluid flows into and through the pressure adjusting unit 15 via the LS flow path 16, which is provided in such a way as to communicate with the LS portion 41, so that the pressure adjusting action is obtained.

In the case of this rotational operation (in a case where the driver rotationally operates the steering wheel S rightward (clockwise)), the action of rotating the sleeve 40 obtained by driving of the gerotor 30 and the action of steering for the steering cylinder C are able to be obtained as similar actions to those in the case of the previously-described rotational operation (in a case where the driver rotationally operates the steering wheel S leftward (counterclockwise)) except that the directions are made opposite.

Figure 8:
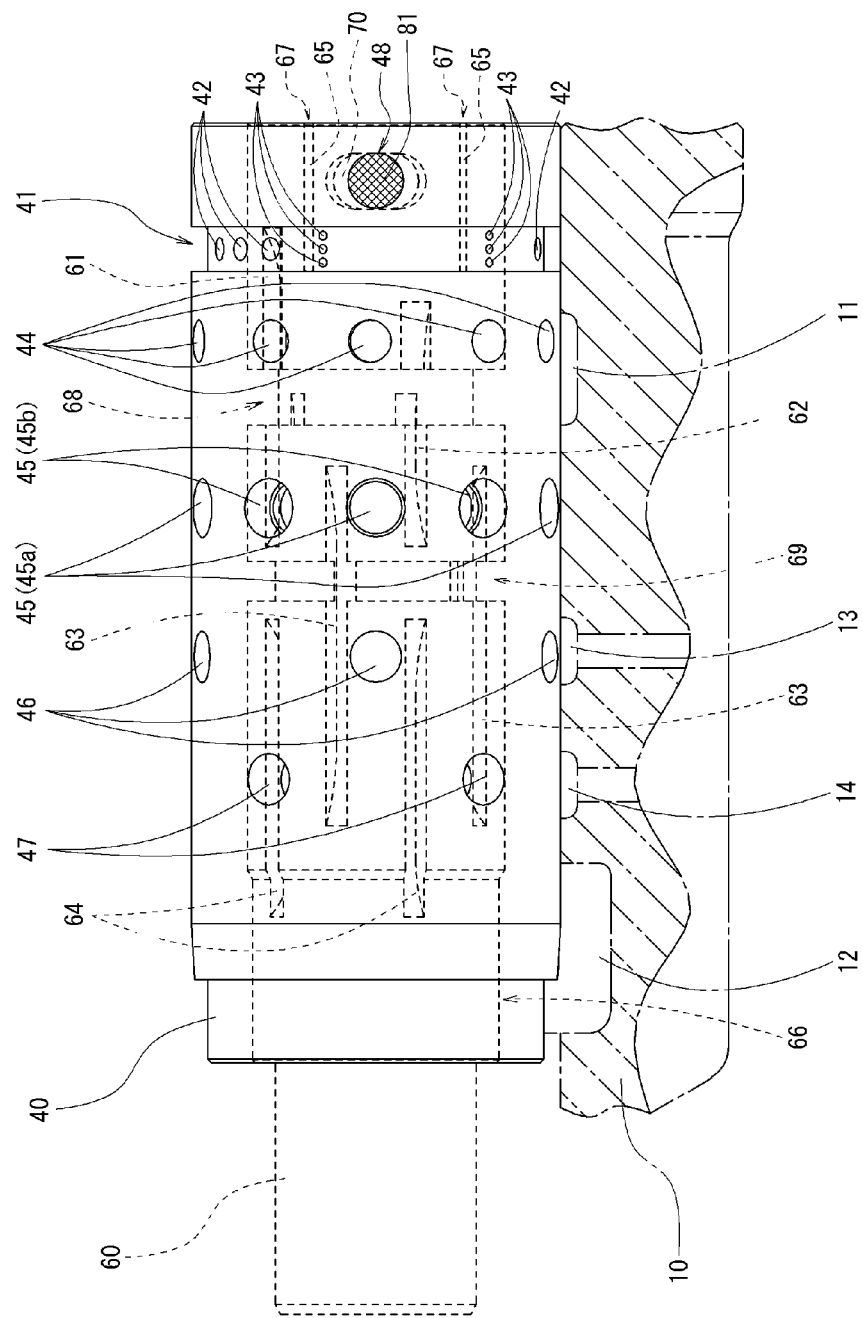
FIG. 8 is a schematic view illustrating a modification example of the power steering valve according to the embodiment of the present invention.

In the following description, a modification example of the power steering valve 1 according to the present embodiment is described with reference to FIG. 8. Here, FIG. 8 is an explanatory diagram used for an illustration similar to that of FIG. 7. As illustrated in this figure, it is conceivable to employ a configuration in which the position of the pin 81 used to fix the drive shaft 80 (i.e., the positions of the through-hole 48 of the sleeve 40 and the thorough-hole 70 of the spool 60) is arranged to be a position nearer the gerotor 30 than a position at which the LS portion 41 is arranged in the sleeve 40. Even this configuration enables obtaining a function effect similar to that in the above-described embodiment.

As described above, according to the power steering valve to which the present invention is applied, a new configuration studied out relative to a conventional power steering valve, which has been difficult to simply reduce in size, enables relatively implementing a reduction in size, particularly, a reduction in diameter. With this, for example, in a case where the power steering valve is applied to a small-capacity steering cylinder, it becomes possible to resolve a problem in which, in the past, an overdesigned main body portion has had to be used, so that it becomes possible to attain a reduction in cost such as material cost and a reduction in equipment weight.

Furthermore, the present invention is in no way limited to the above-described embodiment and can be modified in various manners within a range not departing from the present invention.

What is claimed is:

1. A power steering valve comprising:
   a housing including a supply flow path into which hydraulic fluid flows from a hydraulic pressure source, a tank flow path from which the hydraulic fluid flows out to a reservoir tank, and a plurality of control flow paths from which the hydraulic fluid flows out to a steering cylinder and into which the hydraulic fluid flows from the steering cylinder;
   a sleeve cylindrically shaped, having a circumferential wall in which a plurality of openings into which the hydraulic fluid flows and from which the hydraulic fluid flows out is formed in a penetrating manner, and held in such a way as to be able to rotate in a circumferential direction within the housing;
   a spool cylindrically shaped, having a circumferential surface in which a plurality of axial grooves into and through which the hydraulic fluid from a predetermined one of the openings of the sleeve flows is drilled, held in such a way as to be able to rotate within a predetermined range in a circumferential direction within the sleeve, and having a second end portion to which an input shaft of a steering wheel is coupled;
   a gerotor fixed to a first end portion of the housing and configured to be driven by the hydraulic fluid which flows out from a predetermined one of the openings of the sleeve; and
   a drive shaft having a first end portion which meshes with an inner rotor of the gerotor and a second end portion which is pivotally supported in a swingable manner by the sleeve with use of a pin,
   wherein the hydraulic fluid which flows in from the gerotor is configured to flow through according to an amount of overlap between a predetermined one of the axial grooves of the spool and a predetermined one of the openings of the sleeve, which is set in association with rotation of the steering wheel, and flow out to the steering cylinder via the control flow paths,
   wherein the drive shaft is formed with a dimension defined in such a manner that an overall length thereof Ld is in a range of:

$(1/4) \cdot Ls \leq Ld \leq (1/2) \cdot Ls$ relative to an overall length Ls of the sleeve, and
   wherein the pin is arranged at a position nearer the gerotor in an axial direction than a middle position in the sleeve;
   wherein the housing includes a pressure adjusting unit which adjusts an inflow pressure of the hydraulic fluid which flows from the supply flow path into the sleeve, and an LS flow path which communicates with the pressure adjusting unit, and has a circuit configuration not to communicate with the supply flow path via the sleeve and the spool when the steering wheel is not rotationally operated, and has a circuit configuration to communicate with the supply flow path via the sleeve and the spool when the steering wheel is rotationally operated,
   wherein the sleeve includes, on an outer circumferential surface of a first end portion thereof, an LS portion which causes a part of the hydraulic fluid flowing in from the gerotor to flow out to the LS flow path, and
   wherein the pin is arranged at a position between a position at which an opening which communicates with the supply flow path out of the openings is arranged and a position at which the LS portion is arranged in the sleeve.

2. The power steering valve according to claim 1, wherein the pin is arranged at a position nearer the gerotor in an axial direction than a position at which an opening which communicates with the supply flow path out of the openings is arranged in the sleeve.

3. The power steering valve according to claim 1, wherein the housing includes a pressure adjusting unit which adjusts an inflow pressure of the hydraulic fluid which flows from the supply flow path into the sleeve, and an LS flow path which communicates with the pressure adjusting unit,
   wherein the sleeve includes, on an outer circumferential surface of a first end portion thereof, an LS portion which causes a part of the hydraulic fluid flowing in from the gerotor to flow out to the LS flow path, and
   wherein the pin is arranged at a position between a position at which an opening which communicates with the supply flow path out of the openings is arranged and a position at which the LS portion is arranged in the sleeve.

4. The power steering valve according to claim 2, wherein the housing includes a pressure adjusting unit which adjusts an inflow pressure of the hydraulic fluid which flows from the supply flow path into the sleeve, and an LS flow path which communicates with the pressure adjusting unit,
   wherein the sleeve includes, on an outer circumferential surface of a first end portion thereof, an LS portion which causes a part of the hydraulic fluid flowing in from the gerotor to flow out to the LS flow path, and
   wherein the position of the pin is arranged between a position at which an opening which communicates with the supply flow path out of the openings is arranged and a position at which the LS portion is arranged in the sleeve.

5. The power steering valve according to claim 3, wherein the sleeve includes, as the openings, an opening for LS, which is arranged at the LS portion, an opening for neutral, a supply opening, which communicates with the supply flow path and into which the hydraulic fluid flows, an input-output opening, from which the hydraulic fluid flows to the gerotor or into which the hydraulic fluid flows from the gerotor, and a first control opening and a second control opening, which communicate with a first control flow path and a second control flow path included in the control flow paths, respectively, and from which and into which the hydraulic fluid flows, each of which is provided as one opening or a plurality of openings,
   wherein the spool includes, as the axial grooves, a first groove, which is formed to have a length leading from the opening for LS to the input-output opening via the supply opening, a second groove, which is formed to have a length leading from the supply opening to the input-output opening, a third groove, which is formed to have a length leading from the input-output opening to the second control opening via the first control opening, a fourth groove, which is formed to have a length leading from the first control opening to a circumferential surface flow path, which is annularly formed on an outer circumferential surface of the spool and communicates with the tank flow path, via the second control opening, and a fifth groove, which is formed to have a length leading from the opening for neutral to a penetration flow path, which is provided at a first end portion of the spool and communicates with an inner cylinder portion of the spool, each of which is provided as one groove or a plurality of grooves, and further includes, on the outer circumferential surface, a first annular groove, which is annularly formed in such a way as to communicate with all of the plurality of first grooves and all of the plurality of second grooves, and a second annular groove, which is annularly formed in such a way as to communicate with all of the plurality of third grooves.

6. The power steering valve according to claim 4, wherein the sleeve includes, as the openings, an opening for LS, which is arranged at the LS portion, an opening for neutral, a supply opening, which communicates with the supply flow path and into which the hydraulic fluid flows, an input-output opening, from which the hydraulic fluid flows to the gerotor or into which the hydraulic fluid flows from the gerotor, and a first control opening and a second control opening, which communicate with a first control flow path and a second control flow path included in the control flow paths, respectively, and from which and into which the hydraulic fluid flows, each of which is provided as one opening or a plurality of openings, wherein the spool includes, as the axial grooves, a first groove, which is formed to have a length leading from the opening for LS to the input-output opening via the supply opening, a second groove, which is formed to have a length leading from the supply opening to the input-output opening, a third groove, which is formed to have a length leading from the input-output opening to the second control opening via the first control opening, a fourth groove, which is formed to have a length leading from the first control opening to a circumferential surface flow path, which is annularly formed on an outer circumferential surface of the spool and communicates with the tank flow path, via the second control opening, and a fifth groove, which is formed to have a length leading from the opening for neutral to a penetration flow path, which is provided at a first end portion of the spool and communicates with an inner cylinder portion of the spool, each of which is provided as one groove or a plurality of grooves, and further includes, on the outer circumferential surface, a first annular groove, which is annularly formed in such a way as to communicate with all of the plurality of first grooves and all of the plurality of second grooves, and a second annular groove, which is annularly formed in such a way as to communicate with all of the plurality of third grooves.

7. The power steering valve according to claim 5, wherein the spool is formed to have such a dimension that a circumferential width Dx of the third groove and a circumferential width Dy of the fourth groove satisfy:

$Dx=Dy$, and with respect to a diameter Ds of the input-output opening of the sleeve, satisfy:

$(1/2) \cdot Ds < Dx < Ds$ $(1/2) \cdot Ds < Dy < Ds$.

8. The power steering valve according to claim 6, wherein the spool is formed to have such a dimension that a circumferential width Dx of the third groove and a circumferential width Dy of the fourth groove satisfy:

$Dx=Dy$, and with respect to a diameter Ds of the input-output opening of the sleeve, satisfy:

$(1/2) \cdot Ds < Dx < Ds$ $(1/2) \cdot Ds < Dy < Ds$.

9. The power steering valve according to claim 5, wherein the sleeve includes, as the opening for LS, a plurality of holes arranged side by side in a circumferential direction and having a relatively large diameter, and includes, as the opening for neutral, a plurality of holes arranged side by side in an axial direction and having a relatively small diameter.

10. The power steering valve according to claim 6, wherein the sleeve includes, as the opening for LS, a plurality of holes arranged side by side in a circumferential direction and having a relatively large diameter, and includes, as the opening for neutral, a plurality of holes arranged side by side in an axial direction and having a relatively small diameter.

11. The power steering valve according to claim 7, wherein the sleeve includes, as the opening for LS, a plurality of holes arranged side by side in a circumferential direction and having a relatively large diameter, and includes, as the opening for neutral, a plurality of holes arranged side by side in an axial direction and having a relatively small diameter.

12. The power steering valve according to claim 8, wherein the sleeve includes, as the opening for LS, a plurality of holes arranged side by side in a circumferential direction and having a relatively large diameter, and includes, as the opening for neutral, a plurality of holes arranged side by side in an axial direction and having a relatively small diameter.

13. The power steering valve according to claim 2, wherein the gerotor is an internal contact-type pump in which the inner rotor is housed in a housing space provided at an outer rotor and rotates while performing sliding movement while raised portions provided on an outer circumference of the inner rotor engage with recessed portions provided on an inner circumference of the housing space, and a number of the recessed portions is set to 6 and a number of the raised portions is set to 5.

14. The power steering valve according to claim 3, wherein the gerotor is an internal contact-type pump in which the inner rotor is housed in a housing space provided at an outer rotor and rotates while performing sliding movement while raised portions provided on an outer circumference of the inner rotor engage with recessed portions provided on an inner circumference of the housing space, and a number of the recessed portions is set to 6 and a number of the raised portions is set to 5.

15. The power steering valve according to claim 4, wherein the gerotor is an internal contact-type pump in which the inner rotor is housed in a housing space provided at an outer rotor and rotates while performing sliding movement while raised portions provided on an outer circumference of the inner rotor engage with recessed portions provided on an inner circumference of the housing space, and a number of the recessed portions is set to 6 and a number of the raised portions is set to 5.

16. The power steering valve according to claim 5, wherein the gerotor is an internal contact-type pump in which the inner rotor is housed in a housing space provided at an outer rotor and rotates while performing sliding movement while raised portions provided on an outer circumference of the inner rotor engage with recessed portions provided on an inner circumference of the housing space, and a number of the recessed portions is set to 6 and a number of the raised portions is set to 5.

17. The power steering valve according to claim 6, wherein the gerotor is an internal contact-type pump in which the inner rotor is housed in a housing space provided at an outer rotor and rotates while performing sliding movement while raised portions provided on an outer circumference of the inner rotor engage with recessed portions provided on an inner circumference of the housing space, and a number of the recessed portions is set to 6 and a number of the raised portions is set to 5.

18. The power steering valve according to claim 7, wherein the gerotor is an internal contact-type pump in which the inner rotor is housed in a housing space provided at an outer rotor and rotates while performing sliding movement while raised portions provided on an outer circumference of the inner rotor engage with recessed portions provided on an inner circumference of the housing space, and a number of the recessed portions is set to 6 and a number of the raised portions is set to 5.

19. The power steering valve according to claim 8, wherein the gerotor is an internal contact-type pump in which the inner rotor is housed in a housing space provided at an outer rotor and rotates while performing sliding movement while raised portions provided on an outer circumference of the inner rotor engage with recessed portions provided on an inner circumference of the housing space, and a number of the recessed portions is set to 6 and a number of the raised portions is set to 5.

20. The power steering valve according to claim 9, wherein the gerotor is an internal contact-type pump in which the inner rotor is housed in a housing space provided at an outer rotor and rotates while performing sliding movement while raised portions provided on an outer circumference of the inner rotor engage with recessed portions provided on an inner circumference of the housing space, and a number of the recessed portions is set to 6 and a number of the raised portions is set to 5.

\* \* \* \* \*